(12) United States Patent
Van Dijk et al.

(10) Patent No.: US 12,297,395 B2
(45) Date of Patent: May 13, 2025

(54) BIOFUEL BLENDS

(71) Applicant: SHELL USA, INC., Houston, TX (US)

(72) Inventors: Nicolaas Van Dijk, Amsterdam (NL);
Harish Kumar Balam, Bangalore (IN);
Michael Richard Pope, London (GB);
Daniel Thomas Shiosaki, Houston, TX
(US); Aldo Caiazzo, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 18/048,247

(22) Filed: Oct. 20, 2022

(65) Prior Publication Data

US 2023/0120183 A1 Apr. 20, 2023

Related U.S. Application Data (60) Provisional application No. 63/257,735, filed on Oct. 20, 2021.

(51) Int. Cl.
*C10L 1/08* (2006.01)
*C10G 1/00* (2006.01)
(Continued)

(52) U.S. Cl.
CPC .............. *C10L 1/08* (2013.01); *C10G 1/002* (2013.01); *C10G 1/006* (2013.01); *C10G 1/02* (2013.01); *C10G 1/06* (2013.01); *C10G 1/08* (2013.01); *C10G 3/50* (2013.01); *C10G 45/02* (2013.01); *C10G 45/58* (2013.01); *C10G 2300/1014* (2013.01); *C10G 2300/1018* (2013.01);
(Continued)

(58) Field of Classification Search
CPC .............. C10L 1/08; C10L 2200/0484; C10L 2290/02; C10L 2290/24; C10G 1/002; C10G 1/006; C10G 1/02; C10G 1/06; C10G 1/08; C10G 3/50; C10G 45/02; C10G 45/58; C10G 2300/1014; C10G 2300/1018; C10G 2300/301; C10G 2300/307; C10G 2400/04; C10G 2400/06
USPC ........................................................ 585/240
See application file for complete search history.

(56) References Cited

U.S. PATENT DOCUMENTS

| 4,125,566 A | 11/1978 | Trin Dinh et al. |
| 4,385,193 A | 5/1983 | Bijwaard et al. |

(Continued)

FOREIGN PATENT DOCUMENTS

| AU | 2020203806 A1 | 7/2020 |
| EP | 0583836 A1 | 2/1994 |
| WO | 2022038265 A1 | 2/2022 |

OTHER PUBLICATIONS

Burgt, M.J.V.D, et al., "The Shell Middle Distillate Synthesis Process", Studies in Surface Science and Catalysis, vol. 36, 1988, pp. 473-482.

(Continued)

*Primary Examiner* — Prem C Singh
*Assistant Examiner* — Francis C Campanell
(74) *Attorney, Agent, or Firm* — SHELL USA, INC.

(57) ABSTRACT

A biofuel includes a mixture of a gasoil generated from hydropyrolysis and hydroconversion of a solid biomass containing lignocellulose. The gasoil has a cetane index less than 46. The biofuel also includes a hydroprocessed ester fatty acid (HEFA) generated from hydrotreating a renewable resource having fats and oils. A cetane index of the biofuel is greater than 46.

6 Claims, 5 Drawing Sheets

(51) Int. Cl.
  *C10G 1/02* (2006.01)
  *C10G 1/06* (2006.01)
  *C10G 1/08* (2006.01)
  *C10G 3/00* (2006.01)
  *C10G 45/02* (2006.01)
  *C10G 45/58* (2006.01)

(52) U.S. Cl.
  CPC . *C10G 2300/301* (2013.01); *C10G 2300/307* (2013.01); *C10G 2400/04* (2013.01); *C10G 2400/06* (2013.01); *C10L 2200/0484* (2013.01); *C10L 2290/02* (2013.01); *C10L 2290/24* (2013.01)

(56) References Cited

U.S. PATENT DOCUMENTS

| | | | |
|---|---|---|---|
| 4,478,955 | A | 10/1984 | Pesa et al. |
| 4,594,468 | A | 6/1986 | Minderhoud et al. |
| 8,912,374 | B2 | 12/2014 | Van Heuzen et al. |
| 9,447,328 | B2 | 9/2016 | Marker et al. |
| 2009/0294324 | A1 | 12/2009 | Brandvold et al. |
| 2010/0160698 | A1* | 6/2010 | Perego ............... B01J 23/883 502/164 |
| 2012/0022307 | A1 | 1/2012 | Yanik et al. |
| 2016/0312125 | A1* | 10/2016 | Linck ..................... C10G 3/42 |
| 2018/0230393 | A1 | 8/2018 | Bauldreay et al. |
| 2023/0019086 | A1 | 1/2023 | Malatak |

OTHER PUBLICATIONS

International Search Report and Written Opinion Received for PCT Patent Application No. PCT/US2022/078419, Mailed on Feb. 13, 2023, 10 Pages.

Huber et al., "Synthesis of Transportation Fuels From Biomass: Chemistry, Catalysts, and Engineering", Chemical Reviews, Feb. 3, 2006, vol. 106, Issue No. 9, pp. 4044-4098.

International Search Report and Written Opinion Received for PCT Patent Application No. PCT/US2022/078417, Mailed on Feb. 9, 2023, 11 Pages.

Non-Final Office Action Received for U.S. Appl. No. 18/048,235 Mailed on Mar. 3, 2023, 11 Pages.

* cited by examiner

BIOFUEL BLENDS

The present disclosure generally relates to a renewable hydrocarbon blend for use as a biofuel. More specifically, the present disclosure relates to a renewable hydrocarbon blend of intermediate products derived from hydroprocessing of liquid and solid biomass.

BACKGROUND OF THE DISCLOSURE

The demand for energy is increasing as a result of worldwide economic growth and development. This increase in the demand for energy has contributed to an increase in the amount of greenhouse gases and the overall carbon footprint. In addition, with increasing demand for liquid transportation fuels, decreasing reserves of crude petroleum oil that may be accessed and recovered easily and increasing constraints on carbon footprints of such fuels, it may be desirable to develop routes to produce liquid transportation fuels from renewable resources in an efficient manner. Such liquid transportation fuels produced from biomass are sometimes also referred to as biofuels. Biomass offers a source of renewable carbon. Examples of suitable biomass include vegetable oils, oils obtained from algae and animal fats, deconstruction materials such as pyrolyzed recyclable materials and wood, among others. Therefore, when using fuels derived from renewable resources, it may be possible to achieve more sustainable $CO_2$ emissions over petroleum-derived fuels. For biofuels to replace all or at least a portion of the carbon-based fossil fuels, the biofuels should meet the required performance and emission specifications of the carbon-based fossil fuels.

One technique for producing liquid transportation fuels from renewable resources is hydroprocessing. However, certain hydroprocessing-based techniques produce hydrocarbon liquid products that do not meet specifications required for diesel and gasoline range products. For example, the hydrocarbon liquid products produced from hydroprocessing-based techniques may have an undesirable distribution of various classes or hydrocarbon compounds (e.g., aromatics, paraffins and naphthenes). As such, the hydrocarbon liquid products resulting from hydroprocessing-based techniques may have octane and cetane numbers for gasoline and diesel, respectively, that do not meet the required specifications for the location at which they will be used.

Additionally, certain properties of the hydrocarbon liquid products may render the hydrocarbon liquid products unsuitable for use as a transportation fuel. For example, based on the source of the biomass, the cold flow properties of the hydrocarbon liquid products are such that waxing of the hydrocarbon liquid products occurs at low temperatures. Therefore, these products may not be suitable for use in cold climates. Hydrocarbon liquid products resulting from hydroprocessing-based processes that do not meet the required specification or have undesirable properties (e.g., cold flow) may either be used as a blending component in a fossil fuel or upgraded in order to be used as the fuel itself.

Accordingly, to meet the increasing demand for fuels and/or fuel components derived from renewable resources, hydroprocessing-based processes used for producing biofuels may benefit from energy-efficient and economically suitable processing options that provide biofuels with desired product quality attributes (e.g., cold flow properties and cetane number, in the case of a diesel boiling range fraction, or octane number, in the case of a gasoline boiling range fraction) without having to undergo a costly upgrading processes. Such processing options could be adapted as needed to meet changing end-product demands for renewable fuels, thereby maximizing overall value and process economics.

SUMMARY

In an embodiment, a biofuel includes a mixture of a gasoil (GO) generated from hydropyrolysis and hydroconversion of a solid biomass containing lignocellulose. The gasoil has a cetane index less than 46. The biofuel also includes a hydroprocessed ester and fatty acid (HEFA) generated from hydrotreating a renewable resource having fats and oils. A cetane index of the biofuel is greater than 46.

In another embodiment, a process for producing a biofuel includes feeding a solid feedstock and hydrogen to a first stage hydropyrolysis reactor. The first stage hydropyrolysis reactor includes one or more deoxygenation catalysts, and the solid feedstock includes a biomass containing lignocellulose. The process also includes hydropyrolysing the solid feedstock in the first stage hydropyrolysis reactor to generate a product stream having partially deoxygenated hydropyrolysis product, $H_2O$, $H_2$, $CO_2$, CO, $C_1$-$C_3$ gases, char and catalyst fines, feeding at least a portion of the product stream to a second stage hydroconversion reactor having one or more hydroconversion catalysts, hydroconverting the partially deoxygenated hydropyrolysis product in the product stream to generate a vapor phase product having substantially fully deoxygenated hydrocarbon product, $H_2O$, CO, $CO_2$, and $C_1$-$C_3$ gases, and condensing the vapor phase product to generate a deoxygenated hydrocarbon liquid having the substantially fully deoxygenated hydrocarbon product. The substantially fully deoxygenated hydrocarbon product includes a gasoil (GO) having a cetane index of less than 46. The process further includes mixing the gasoil with a hydroprocessed ester fatty acid (HEFA) to generate the biofuel having a cetane index greater than 46.

In a further embodiment, a process for producing a biofuel includes mixing a gasoil derived from hydropyrolysis and hydroconversion of a biomass containing lignocellulose with a hydroprocessed ester and fatty acid (HEFA). The gasoil has a cetane index less than 46 and a boiling point greater than 145 degrees Celsius (° C.).

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

Advantages of the disclosure may become apparent upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount.

Definitions

The terms "linear paraffins" and "normal paraffins" or "n-paraffins" as used herein are intended to denote long straight chain saturated hydrocarbons such as, for example, normal hexadecane (n-C16). The term "non-linear paraffins" as used herein is intended to denote saturated branched hydrocarbons such as, for example, secondary paraffins and tertiary paraffins. The term "iso-paraffins" as used herein is intended to denote secondary non-cyclic branched paraffins such as, for example, iso-hexadecane (i-C16). The term "unsaturated hydrocarbons" as used herein is intended to denote hydrogen deficient hydrocarbons such as, for example, olefins, naphthenes, cycloparaffins, and aromatics.

Hydroprocessing is a catalytic process that includes hydropyrolysis, hydroconversion and/or hydrotreating of certain carbon-containing materials to generate hydrocarbon fuels. Carbon-containing materials that may be used to generate hydrocarbon fuels via hydroprocessing include solid and/or liquid feedstocks from renewable resources such as, for example, biomass, waste plastics, and biorenewable fats and oils containing triglycerides, diglycerides, monoglycerides and free fatty acids or fatty acid esters. For example, a feedstock such as vegetable oil yields biofuels having desirable cetane indices (e.g., a cetane index greater than 46). However, due to the large amount of linear paraffins (e.g., saturated long chain hydrocarbons having at least 15 carbon atoms) present in the biofuel, the cold flow properties of the biofuel produced from highly saturated feedstock may be undesirable. For example, the biofuels having a high linear paraffinic content (e.g., greater than or equal to approximately 95 wt %) may have a cloud point (CP) or cold filter plugging point (CFPP) greater than 15° C.

In contrast, solid biomass feedstock such as lignocellulosic materials (e.g., wood), among others, are highly cyclic (e.g., greater than 75 wt % of hydrocarbons are in rings). For example, the lignocellulosic materials include cyclic compounds such as aromatics, non-aromatics, and carbohydrates. As such, these highly cyclic feedstocks result in biofuels having non-linear and cyclic paraffins which results in cold flow properties suitable for cold climates (e.g., climates where ambient temperatures may fall below freezing temperature of water, 0° C.). Besides these cyclic paraffins or naphthenes, these biofuels also contain unsaturated cyclic compounds and aromatics. The aromatic content of these biofuels may be undesirable (e.g., aromatic content of greater than 25 wt %), resulting in a cetane index that is not within the required specification for commercial use. For example, the cetane index for biofuels resulting from hydroprocessing of solid biomass materials may be less than 46. Accordingly, these biofuels may undergo additional processing and/or include additives to upgrade and yield commercially suitable transportation biofuels.

For example, gasoils (GO) (e.g., diesel) generated via catalytic hydropyrolysis and hydroconversion of solid biomass feedstock are generally dense (e.g., a density greater than approximately 845 kilograms (kg)/cubic meter ($m^3$)), and have a high unsaturated hydrocarbon content (e.g., greater than approximately 75% wt %) and a low amount of linear paraffinic compounds (e.g., less than approximately 25 wt %). The high aromaticity of the biodiesel results in low cetane indices (e.g., <46), thereby its quality and/or performance as a transportation fuel is undesirable and may not meet the specifications set forth by regulatory agencies. While the low amount of linear paraffinic compounds in these highly aromatic biodiesels results in desirable cold flow properties (e.g., cloud point and cold filter plugging point temperatures), the aromaticity results in low cetane indices (e.g., less than approximately 46). As such, these biodiesels generally undergo costly and extensive hydropolishing to reduce the aromaticity and increase the cetane index above approximately 46. In certain instances, hydropolishing may not be enough to upgrade the biodiesel into a suitable transportation biofuel, and the hydropolished biodiesel undergoes additional processing. Therefore, biodiesel fractions derived from solid biomass feedstock may be combined with cetane improving additives and/or fossil-derived diesel or sold in markets without meeting cetane number specifications, thereby increasing the carbon footprint of these biodiesels. In addition, while these GO generally have good cold flow properties, the cloud points may still not be suitable for certain sub-zero climates (e.g., arctic climates). As such, cloud point depressants may be added to the GO to lower and improve the cloud point compared to GO that not have the cloud point depressant. However, the cloud point depressant may not work for all GO and optimization of the GO/cloud point depressant formulations may be difficult. Accordingly, it may be desirable to develop biodiesel (GO) formulations that do not require upgrading or the use of additives (e.g., cloud point depressants) to improve the cetane index and/or cloud point.

Unlike hydroprocessing of solid biomass, hydroprocessing biorenewable fats and oils (e.g., vegetable oil) generates hydrotreated esters and fatty acids (HEFA) that have low aromaticity (e.g., less than or equal to approximately 1 wt %) and high linear paraffinic content (e.g., greater than or equal to approximately 95 wt %) content compared to the biodiesel generated from hydropyrolysis and hydroconversion of the solid biomass feedstock. The low aromaticity of the HEFA is desirable because it yields biodiesel having cetane indices greater than 46, which meet regulatory specifications for commercial use. However, the high linear paraffinic content in the HEFA results in undesirable cold flow properties (e.g., cloud point and cold filter plugging point temperatures greater than 15° C.). Therefore, HEFA derived biodiesel may not be suitable for use in climates in which the temperatures are less than 0° C. Accordingly, similar to the solid biomass-derived biodiesel, the HEFA derived biodiesel undergoes additional processing to hydroisomerize the n-paraffins to generate iso-paraffins, and improve the cold flow properties of the biodiesel. However, HEFA may have an undesirable low density. For example, HEFA biodiesel may have a density of between 760 and 800 kg/m$^3$, which does not meet the minimum density specification of 825 kg/m$^3$ for ultra-low sulfur diesel (ULSD) in Europe. As such, diesel boiling range fractions (e.g., boiling point range 180-360° C.) derived from HEFA are combined with fossil-derived diesel having a higher density and, in certain instances, a lower cloud point compared to HEFA alone. As such, certain biodiesel may be low quality and/or have an undesirable carbon footprint (e.g., when combined with fossil-derived fuels). Therefore, certain isomerized HEFA derived biofuel fractions may undergo additional processing to continue upgrading and improving the cold flow properties and quality of the biofuel. The degree of isomerization of the HEFA may depend on target use for HEFA derived biofuels.

Additional processing of biodiesel to upgrade and improve the cetane index/number, density and/or cold flow properties may be cumbersome, inefficient and costly. In addition, renewable and fossil-derived fuel blends have a higher carbon footprint/intensity compared to biofuels alone. Therefore, there is a current need to improve the quality of biofuels derived from renewable resources such that they may be used as transportation fuels without the need for additional costly processing to upgrade the biofuels and/or blending with fossil-derived fuels. Accordingly, disclosed herein is a biodiesel blend having a mixture of intermediate products produced from hydroprocessing of a solid biomass feedstock and HEFA. Surprisingly, as discussed in further detail below, the hydroprocessing intermediate products may be combined with HEFA to yield biodiesel fuel blends having cold flow properties that are better than model predicted cold flow properties associated with blends. In addition, the biodiesel fuel blends have the desired cetane index/number and density. As such, by blending the hydroprocessing intermediate products with the HEFA, costly upgrading processes such as hydropolishing may be omitted when producing commercially viable biodiesel fuels.

Figure 1:
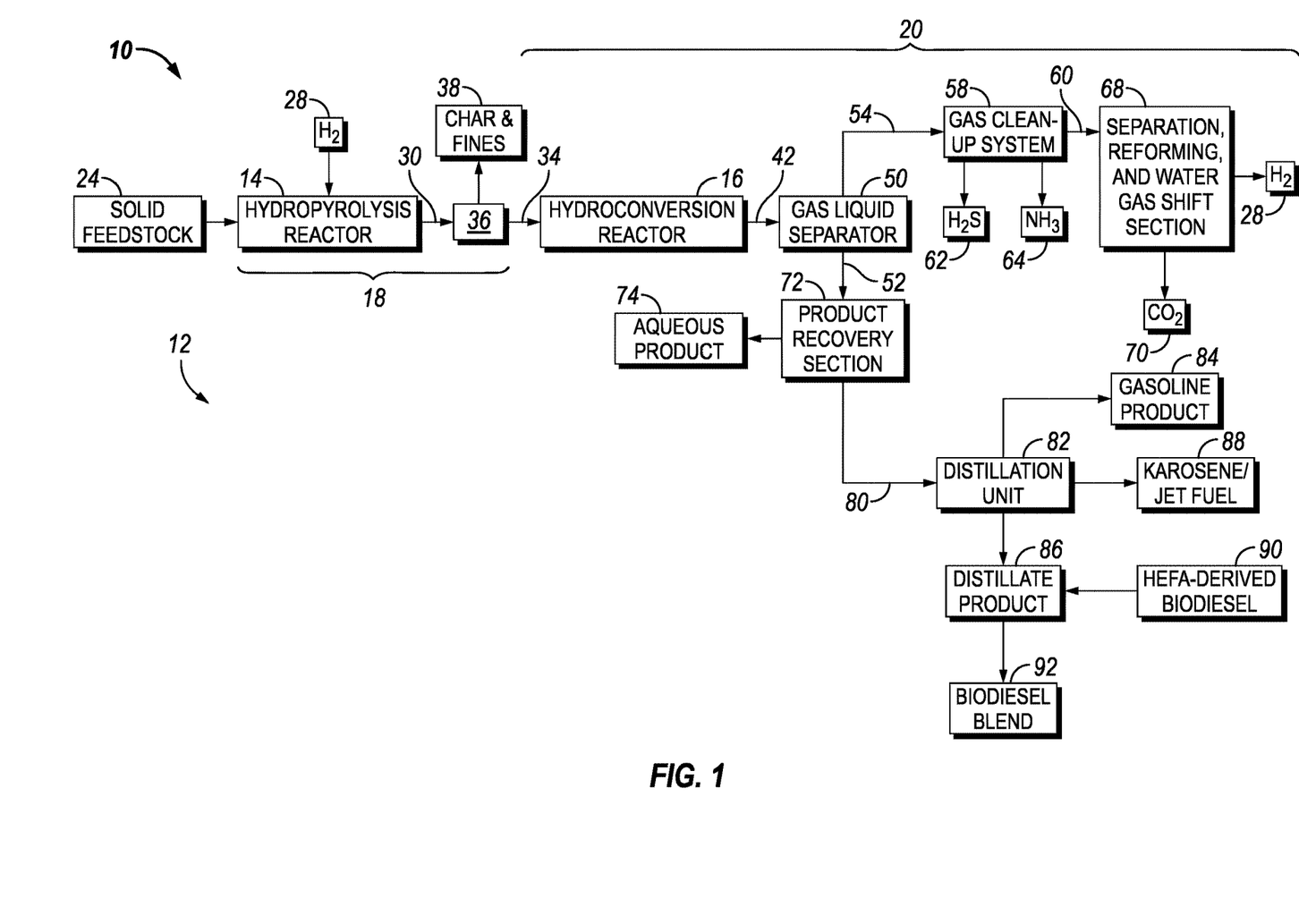
FIG. 1 is a hydroprocessing system having a first stage and a second stage used to produce a gasoil (GO) from biomass used to generate a biofuel blend, in accordance with an embodiment of the present disclosure.

With the foregoing in mind, FIG. 1 is a block diagram of an embodiment of a system 10 that may be used for hydroprocessing solid feedstocks (e.g., biomass and/or waste plastics/oils) to generate one or more hydrocarbon products (e.g., GO/diesel, gasoline, kerosene, etc.) used to generate at least a portion of the biofuel blend disclosed herein. As should be appreciated, the solid feedstock-derived hydrocarbon products disclosed herein may be generated by any suitable hydroprocessing technique such as those disclosed in U.S. Pat. No. 9,447,328, which is hereby incorporated by reference in its entirety. In the illustrated embodiment, the system 10 includes a hydropyrolysis reactor 14 and a hydroconversion reactor 16. As discussed in further detail below, the reactors 14, 16 are used to convert a solid feedstock into an intermediate hydrocarbon fuel fraction (e.g., a GO/diesel fraction) that may be used in combination with a hydrotreated ester and fatty acid (HEFA) to generate a commercially viable biodiesel. As illustrated, the reactors 14, 16 are disposed within one of two stages. For example, the system 10 includes a first stage 18 and a second stage 20. The first stage 18 includes the hydropyrolysis reactor 14, and the second stage 20 includes the hydroconversion reactor 16. The reaction pressure in the first stage 18 and the second stage 20 may be varied to tailor the boiling point distribution and composition of the resultant hydrocarbon product(s) generated by the second stage 18. The ability to tailor the boiling point distribution and/or composition of the resultant hydrocarbon product by varying the reaction pressure may provide an efficient process for generating commercially viable hydrocarbon biofuels that meet the different requirements set forth by the location and/or market in which the hydrocarbon biofuel will be used. For example, when the reaction pressure is less than approximately 0.6 megapascals (MPa) the occurrence of undesirable olefin and/or aromatic saturation reactions may be decreased and cetane numbers for biodiesel and/or gasoline fractions may be increased compared to reaction pressures above 2.0 MPa. However, the cetane numbers may still not be at a desired level to meet specifications set forth for commercial biodiesel fuels. Therefore, the biodiesel fraction may need to undergo additional processing (e.g., hydropolishing) to upgrade the biodiesel and increase the cetane number above approximately 50. However, as discussed in further detail below, the biodiesel fraction may be combined with a HEFA such that upgrading the biodiesel fraction is not necessary to improve the cetane number.

First Stage

In the illustrated embodiment, a solid feedstock 24 having biomass (e.g., lignocellulose) and/or waste plastics and molecular hydrogen ($H_2$) 28 are introduced into the hydropyrolysis reactor 14. The hydropyrolysis reactor 14 contains a deoxygenation catalyst that facilitates partial deoxygenation of the solid feedstock 24. For example, in the hydropyrolysis reactor 14, the solid feedstock 24 undergoes hydropyrolysis, producing an output 30 having char, partially deoxygenated products of hydropyrolysis, light gases ($C_1$-$C_3$ gases, carbon monoxide (CO), carbon dioxide ($CO_2$), and $H_2$), water ($H_2O$) vapor and catalyst fines. The hydropyrolysis reactor 14 may be a fluidized bed reactor (e.g., a fluidized bubbling bed reactor), fixed-bed reactor, or any other suitable reactor. In embodiments in which the hydropyrolysis reactor 14 is a fluidized bed reactor, the fluidization velocity, catalyst particle size and bulk density and solid feedstock particle size and bulk density are selected such that the deoxygenation catalyst remains in the bubbling fluidized bed, while the char produced is entrained with the partially deoxygenated products (e.g., the output 30) exiting the hydropyrolysis reactor 14. The hydropyrolysis step in the first stage 18 employs a rapid heat up of the solid feedstock 24 such that a residence time of the pyrolysis vapors in the hydropyrolysis reactor 14 is preferably less than approximately 1 minute, more preferably less than approximately 30 seconds and most preferably less than approximately 10 seconds.

The solid feedstock 24 used in the disclosed process may include a residual waste feedstock and/or a biomass feedstock containing lignin, lignocellulosic, cellulosic, hemicellulosic material, or any combination thereof. Lignocellulosic material may include a mixture of lignin, cellulose and hemicelluloses in any proportion and also contains ash and moisture. Such material is more difficult to convert into fungible liquid hydrocarbon products than cellulosic and hemicellulosic material. It is an advantage of the present process that it can be used for lignocellulose-containing biomass. Therefore, the solid feedstock 24 used in the disclosed process preferably contains lignocellulosic material. Suitable lignocellulose-containing biomass includes woody biomass and agricultural and forestry products and residues (whole harvest energy crops, round wood, forest slash, bamboo, sawdust, bagasse, sugarcane tops and trash, cotton stalks, corn stover, corn cobs, castor stalks, Jatropha whole harvest, Jatropha trimmings, de-oiled cakes of palm, castor and Jatropha, coconut shells, residues derived from edible nut production and mixtures thereof), and municipal solid wastes containing lignocellulosic material. The municipal solid waste may include any combination of lignocellulosic material (yard trimmings, pressure-treated wood such as fence posts, plywood), discarded paper and cardboard and waste plastics, along with refractories such as glass, metal. Prior to use in the process disclosed herein, municipal solid waste may be optionally converted into pellet or briquette form. The pellets or briquettes are commonly referred to as Refuse Derived Fuel in the industry. Certain feedstocks (such as algae and lemna) may also contain protein and lipids in addition to lignocellulose. Residual waste feedstocks are those having mainly waste plastics. In a preferred embodiment of the process disclosed herein, woody biomass, preferably wood, is used as the source of the biomass.

The solid feedstock 24 may be provided to the hydropyrolysis reactor 14 in the form of loose biomass particles having a majority of particles preferably less than about 3.5 millimeters (mm) in size or in the form of a biomass/liquid slurry. However, as appreciated by those skilled in the art, the solid feedstock 24 may be pre-treated or otherwise processed in a manner such that larger particle sizes may be accommodated. Suitable means for introducing the solid feedstock 24 into the hydropyrolysis reactor 14 include, but are not limited to, an auger, fast-moving (greater than about 5 minutes (m)/second (sec)) stream of carrier gas (such as inert gases and $H_2$), and constant-displacement pumps, impellers, turbine pumps or the like. In an embodiment of the present disclosure, a double-screw system having a slow screw for metering the solid feedstock 24 followed by a fast screw to push the solid feedstock 24 into the reactor without causing torrefaction in the screw housing is used for dosing. An inert gas or hydrogen flow is maintained over the fast screw to further reduce the residence time of the solid feedstock 24 in the fast screw housing.

The hydropyrolysis step is carried out in the hydropyrolysis reactor 14 at a temperature in the range of from approximately 350 Celsius (° C.) to approximately 600° C. and a pressure in the range of from approximately 0.1 megapascal (MPa) to approximately 0.6 MPa (approximately 1-6 bar). The heating rate of the solid feedstock 24 is preferably greater than about 100 watts/meter$^2$ (W/m$^2$). The weight hourly space velocity (WHSV) in grams (g) biomass/g catalyst/hour (h) for the hydropyrolysis step is in the range of from approximately 0.2 h$^{-1}$ to approximately 10 h$^{-1}$, preferably in the range of from approximately 0.3 h$^{-1}$ to 3 h$^{-1}$.

The hydropyrolysis step may operate at a temperature between approximately 300° C. and 650° C. The temperatures used in hydropyrolysis rapidly devolatilize the solid feedstock 24. Thus, in a preferred embodiment, the hydropyrolysis step includes the use of an active catalyst (e.g., a deoxygenation catalyst) to stabilize the hydropyrolysis vapors. The activity of the catalyst used herein remains high and stable over a long period of time such that it does not rapidly coke. Catalyst particle sizes, for use in the hydropyrolysis reactor 14, are preferably in the range of from approximately 0.3 millimeter (mm) to approximately 4.0 mm, more preferably in the range of from approximately 0.6 mm to approximately 3.0 mm, and most preferably in the range of from approximately 1 mm to approximately 2.4 mm.

Any deoxygenation catalyst suitable for use in the temperature range of the hydropyrolysis process may be used. Preferably, the deoxygenation catalyst is selected from sulfided catalysts having one or more metals from the group consisting of nickel (Ni), cobalt (Co), molybdenum (Mo) or tungsten (W) supported on a metal oxide. Suitable metal combinations include sulfided NiMo, sulfided CoMo, sulfided NiW, sulfided CoW and sulfided ternary metal systems having any 3 metals from the family consisting of Ni, Co, Mo and W. Monometallic catalysts such as sulfided Mo, sulfided Ni and sulfided W are also suitable for use. Metal combinations for the deoxygenation catalyst used in accordance with certain embodiments of the present disclosure include sulfided NiMo and sulfided CoMo. Supports for the sulfided metal catalysts include metal oxides such as, but not limited to, alumina, silica, titania, ceria and zirconia. Binary oxides such as silica-alumina, silica-titania and ceria-zirconia may also be used. Preferably, the supports include alumina, silica and titania. In certain embodiments, the support contains recycled, regenerated and revitalized fines of spent hydrotreating catalysts (e.g., fines of CoMo on oxidic supports, NiMo on oxidic supports and fines of hydrocracking catalysts containing NiW on a mixture of oxidic carriers and zeolites). Total metal loadings on the deoxygenation catalyst are preferably in the range of from approximately 1.5 weight percent (wt %) to approximately 50 wt % expressed as a weight percentage of calcined deoxygenation catalyst in oxidic form (e.g., weight percentage of Ni (as NiO) and Mo (as $MoO_3$) on calcined oxidized NiMo on alumina support). Additional elements such as phosphorous (P) may be incorporated into the deoxygenation catalyst to improve the dispersion of the metal.

The first stage of the process disclosed herein produces the output 30 having a partially deoxygenated hydropyrolysis product. The term "partially deoxygenated" as used herein denotes a material in which at least 30 weight % (wt %), preferably at least 50 wt %, more preferably at least 70 wt % of the oxygen present in the original solid feedstock 24 (e.g., lignocelluloses-containing biomass) has been removed. The extent of oxygen removal refers to the percentage of the oxygen in the solid feedstock 24 (e.g., biomass), excluding that contained in the free moisture in the solid feedstock 24. This oxygen is removed in the form of water ($H_2O$), carbon monoxide (CO) and carbon dioxide ($CO_2$) in the hydropyrolysis step. Although it is possible that nearly 100 wt % of the oxygen present in the solid feedstock 24 is removed, generally at most 99 wt %, suitably at most 95 wt % will be removed in the hydropyrolysis step.

Char Removal

As discussed above, the output 30 produced from the hydropyrolysis step in the hydropyrolysis reactor 14 includes a mixed solid and vapor product that includes char, ash, catalyst fines, partially deoxygenated hydropyrolysis product, light gases ($C_1$-$C_3$ gases, CO, $CO_2$, hydrogen sulfide ($H_2S$), ammonia ($NH_3$) and $H_2$), $H_2O$ vapor, vapors of $C_{4+}$ hydrocarbons and oxygenated hydrocarbons. Char, ash and catalyst fines are entrained with the vapor phase product. Therefore, between the hydropyrolysis and hydroconversion steps, the first stage 18 and the second stage 20, respectively, char and catalyst fines are removed from the vapor phase product (e.g., the partially deoxygenated hydropyrolysis product). Any ash present may also be removed at this stage.

In certain embodiments, the hydropyrolysis reactor 14 may include solid separation equipment (e.g., cyclones), for example above a dense bed phase, to mitigate the entrainment of solid particles above a certain particle size. In addition, or alternatively, the solid separation equipment may be positioned downstream from the hydropyrolysis reactor 14 that removes the char and other solids in the output 30 to generate a vapor phase product 34. For example, as illustrated in FIG. 1, the output 30 is fed to a solid separator 36 that separates/removes the solids (e.g., char, ash and catalyst fines 38) from the output 30. The char and catalyst fines 38 may be removed from the output 30 by cyclone separation, filtering, electrostatic precipitation, inertial separation, magnetic separation, or any other suitable solid separation technique and combinations thereof. In one embodiment, the solid separator 36 includes one or more cyclones. For example, char may be removed by filtration from the vapor stream (e.g., the output 30) or by way of filtering from a wash step-ebullated bed. Back pulsing may be employed in removing char and other solids from the filters as long as hydrogen used in the disclosed process sufficiently reduces the reactivity of the pyrolysis vapors and renders the char free-flowing.

In other embodiments, the solid separator 36 includes one or more filters or a combination of cyclones, filters and other suitable solid separation equipment to remove the entrained solids from the output 30. For example, the char 38 and other solids may be removed by cyclone separation followed by hot gas filtration. The hot gas filtration removes fines not removed in the cyclones. In this embodiment, the dust cake caught on the filters is more easily cleaned compared to the char removed in the hot filtration of the aerosols produced in conventional fast pyrolysis because the hydrogen from the hydropyrolysis step stabilizes the free radicals and saturated the olefins. In accordance with another embodiment of the present disclosure, cyclone separation followed by trapping the char and catalyst fines 38 in a high-porosity solid adsorbent bed is used to remove the char and catalyst fines 38 from the output 30. By way of non-limiting example, high-porosity solid adsorbents suitable for trapping the char and catalyst fines 38 include alumina silicate materials. Inert graded bed and/or filter materials may also be used to remove the char and catalyst fines 38 from the output 30 to generate the vapour phase product 34.

The char and catalyst fines 38 may also be removed by bubbling the first stage product gas (e.g., the output 30) through a re-circulating liquid. The re-circulated liquid includes a high boiling point portion of a finished oil from this process (e.g., from the second stage 20) and is thus a fully saturated (hydrogenated), stabilized oil having a boiling point above approximately 370° C. In certain embodiments, the finished oil may be a heavy oil generated in a separate process. The char or catalyst fines 38 from the first stage 18 are captured in this liquid. A portion of the liquid may be filtered to remove the fines 38 and a portion may be re-circulated back to the hydropyrolysis reactor 14. By using a re-circulating liquid, the temperature of the char-laden process vapors from the first stage 18 is lowered to a temperature suitable for the hydroconversion step in the second stage 20, while also removing fine particulates of char and catalyst. Additionally, employing liquid filtration avoids the use of hot gas filtration.

In accordance with another embodiment of the present disclosure, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the hydropyrolysis reactor 14, which is generally less than 200 mesh (smaller than 70 micrometers ($\mu$m)).

Second Stage

Following removal of the char and catalyst fines 38, the vapor phase product 34 (e.g., the partially deoxygenated hydropyrolysis product) together with the $H_2$, CO, $CO_2$, $H_2O$, and $C_1$-$C_3$ gases from the hydropyrolysis step (e.g., the first stage 18) are fed into the hydroconversion reactor 16 in the second stage 20 and subjected to a hydroconversion step. The hydroconversion step is carried out at a temperature in the range of from approximately 300° C. to approximately 600° C. and a pressure in the range of from approximately 0.1 MPa to approximately 0.6 MPa. As should be noted, pressures higher than 0.6 MPa may be used to tailor the boiling point distribution and composition of the resultant hydrocarbon product based on the desired specifications of the hydrocarbon fuel produced by the hydroprocessing. The weight hourly space velocity (WHSV) for this step is in the range of approximately 0.1 $h^{-1}$ to approximately 2 $h^{-1}$. The hydroconversion reactor 16 is a fixed bed reactor. However, in certain embodiments, the hydroconversion reactor 16 may be a fluidized bed reactor. The vapor phase product 34 undergoes hydroconversion in the presence of a hydroconversion catalyst to generate a fully deoxygenated hydrocarbon product 42. The term "fully deoxygenated" as used herein denotes a material in which at least 98 wt %, preferably at least 99 wt %, more preferably at least 99.9 wt % of the oxygen present in the original solid feedstock 24 (e.g., lignocelluloses-containing biomass) has been removed. The hydrocarbon product 42 contains light gaseous hydrocarbons, such as methane, ethane, ethylene, propane and propylene, naphtha range hydrocarbons, middle-distillate range hydrocarbons, hydrocarbons boiling above 370° C. (based on ASTM D86), hydrogen and by-products of the hydroconversion reactions such as $H_2O$, $H_2S$, $NH_3$, CO and $CO_2$.

The solid feedstock 24 used in the disclosed processes may contain metals such as, but not limited to, sodium (Na), potassium (K), calcium (Ca) and phosphorus (P). These metals may poison the hydroconversion catalyst used in the second stage 20. However, these metals may be removed with the char and ash products (e.g., the char and catalyst fines 38) in the first stage 18. Accordingly, the hydroconversion catalyst used in the hydroconversion step is protected from Na, K, Ca, P, and other metals present in the solid feedstock 24 which may otherwise poison the hydroconversion catalyst. Moreover, by hydropyrolysis of the solid feedstock 24 in the first stage 18, the hydroconversion catalyst is advantageously protected from olefins and free radicals. The conditions under which hydropyrolysis occurs in the first stage 18 stabilize free radicals generated during high temperature devolatilization of the solid feedstock 24 (e.g., biomass) by the presence of hydrogen and catalyst, thereby generating stable hydrocarbon molecules that are less prone to, for example, coke formation reactions which may deactivate the catalyst.

The hydroconversion catalyst used in the hydroconversion step includes any suitable hydroconversion catalyst having a desired activity in the temperature range of the disclosed hydroconversion process. For example, the hydroconversion catalyst is selected from sulfided catalysts having one or more metals from the group consisting of Ni, Co, Mo or W supported on a metal oxide. Suitable metal combinations include sulfided NiMo, sulfided CoMo, sulfided NiW, sulfided CoW and sulfided ternary metal systems having any three metals from the family consisting of Ni, Co, Mo and W. Catalysts such as sulfided Mo, sulfided Ni and sulfided W are also suitable for use. The metal oxide supports for the sulfided metal catalysts include, but are not limited to, alumina, silica, titania, ceria, zirconia, as well as binary oxides such as silica-alumina, silica-titania and ceria-zirconia. Preferred supports include alumina, silica and titania. The support may optionally contain regenerated and revitalized fines of spent hydrotreating catalysts (e.g., fines of CoMo on oxidic supports, NiMo on oxidic supports and fines of hydrocracking catalysts containing NiW on a mixture of oxidic carriers and zeolites). Total metal loadings on the catalyst are in the range of from approximately 5 wt % to approximately 35 wt % (expressed as a weight percentage of calcined catalyst in oxidic form, e.g., weight percentage of nickel (as NiO) and molybdenum (as $MoO_3$) on calcined oxidized NiMo on alumina catalyst). Additional elements such as phosphorous (P) may be incorporated into the catalyst to improve the dispersion of the metal. Metals can be introduced on the support by impregnation or co-mulling or a combination of both techniques. The hydroconversion catalyst used in the hydroconversion step may be, in composition, the same as or different to the deoxygenation catalyst used in the hydropyrolysis step (e.g., first stage 18). In one embodiment of the present disclosure, the hydropyrolysis catalyst includes sulfided CoMo on alumina support and the hydroconversion catalyst includes sulfided NiMo on alumina support.

Following the hydroconversion step, the fully deoxygenated hydrocarbon product 42 is fed to one or more condensers that condenses the hydrocarbon product 42. The condensed hydrocarbon product 42 is fed to a gas-liquid separator 50 to provide a liquid phase product 52 having substantially fully deoxygenated $C_{4+}$ hydrocarbon liquid and aqueous material. The term "substantially fully deoxygenated" is used herein to denote a material in which at least 90 wt % to 99 wt % of the oxygen present in the original lignocellulose containing biomass (e.g., the solid feedstock 24) has been removed. Accordingly, the resulting liquid phase product 52 (e.g., the substantially fully deoxygenated hydrocarbon $C_{4+}$ liquid) contains less than 2 wt %, preferably less than 1 wt %, and most preferably less than 0.1 wt % oxygen. The substantially fully deoxygenated C4+ hydrocarbon liquid is compositionally different from bio-oil that is generated using other low pressure hydroprocesses. For example, the oxygen content of bio-oil is greater (e.g., between approximately 5 wt % to 15 wt %) compared to the liquid phase product 52 (e.g., less than 2 wt %). Therefore, due, in part, to the lower oxygen content of the liquid phase product 52, an amount of acid components (as measured by total acid number) and polar compounds is decreased compared to the bio-oil. By way of non-limiting example, the acid components include carboxylic acids, phenols and mixtures thereof.

The liquid phase product 52 undergoes a separation process in the gas-liquid separator 50 that separates and removes the aqueous material from the substantially fully deoxygenated $C_{4+}$ hydrocarbon liquid. Any suitable phase separation technique may be used to separate and remove the aqueous material from the substantially fully deoxygenated $C_{4+}$ hydrocarbon liquid, thereby generating the liquid phase product 52 having the substantially fully deoxygenated $C_{4+}$ hydrocarbon and non-condensable gases 54. The non-condensable gases 54 includes mainly $H_2$, CO, $CO_2$ and light hydrocarbon gases (typically $C_1$ to $C_3$ and may also contain some $C_{4+}$ hydrocarbons).

In certain embodiments, the non-condensable gases 54 are fed to a gas clean-up system 58. The gas clean-up system 58 removes $H_2S$, $NH_3$ and trace amounts of organic sulfur-containing compounds, if present, as by-products of the process, thereby generating a hydrocarbon stream 60 having CO, $CO_2$, $H_2$ and the light hydrocarbon gases. The gas clean-up system 58 includes one or more process units that remove $H_2S$ 62 and $NH_3$ 64 from the non-condensable gases 54 as by-products of the process. The hydrocarbon stream 60 may be sent to a separation, reforming and water-gas shift section 68 where hydrogen 28 is produced from the light hydrocarbon gases in the hydrocarbon stream 60 and renewable $CO_2$ 70 is discharged as a by-product of the process. A fuel gas stream may be recovered as a by-product of this process. The produced hydrogen 28 may be re-used in the process. For example, the hydrogen 28 may be recycled to the hydropyrolysis reactor 14 in the first stage 18. Sufficient hydrogen is produced for use in the entire process disclosed herein. That is, the quantity of the hydrogen 28 produced by the separation, reforming and water-gas shift section 68 is equal to or greater than the hydrogen required to maintain fluidization and sustain chemical consumption of hydrogen in the process.

The liquid phase product 52 recovered from the gas-liquid separator 50 is fed to a product recovery section 72. In the product recovery section 72, aqueous product 74 is removed from the liquid phase product 52 to generate an intermediate liquid phase product 80. The intermediate liquid phase product 80 may undergo distillation to separate the substantially fully deoxygenated $C_{4+}$ hydrocarbon liquid into fractions according to ranges of the boiling points of the liquid products contained in the intermediate liquid phase product 80. For example, the substantially fully deoxygenated $C_{4+}$ hydrocarbon liquid in the intermediate liquid phase product 80 includes naphtha range hydrocarbons, middle distillate range hydrocarbons (e.g., gasoil, diesel) and vacuum gasoil (VGO) range hydrocarbons.

For the purpose of clarity, "middle distillates" as used herein are hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from between approximately 150° C. to approximately 220° C. Final boiling point of middle distillates, according to ASTM D86 distillation, may vary from between approximately 350° C. to approximately 380° C. "Naphtha" as used herein is one or more hydrocarbons or oxygenated hydrocarbons having four or more carbon atoms and having an atmospheric-equivalent final boiling point that is greater than approximately 90° C. but less than approximately 200° C. A small amount of hydrocarbons produced in the process (approximately less than 3 wt % of total $C_{4+}$ hydrocarbons, and preferably less than 1 wt % of total $C_{4+}$ hydrocarbons) boil at temperatures higher than those for the middle distillates as defined above. That is, these hydrocarbons have a boiling range similar to vacuum-gasoil produced by distillation of petroleum. Gasoline is predominantly naphtha-range hydrocarbons and is used in spark-ignition internal combustion engines. In the United States, ASTM D4814 standard establishes the requirements of gasoline for ground vehicles with spark-ignition internal combustion engines. Gasoil (GO)/diesel is predominantly middle-distillate range hydrocarbons and is used in compression-ignition internal combustion engines. In the United States, ASTM D975 standard covers the requirements of several grades of diesel fuel suitable for various types of diesel engines.

Accordingly, in the illustrated embodiment, the intermediate liquid product 80 is fed to a distillation unit 82 to recover gasoline product 84 and a distillate product 86 (e.g., a middle distillate). In certain embodiments, kerosene/jet fuel 88 are recovered as separate streams from the distillation unit 82. The distillate product 86 (e.g., the middle distillate) contains gasoil (GO), for example biodiesel, and is substantially fully free from oxygen, sulfur and nitrogen. In certain embodiments, the oxygen content of the distillate product 86 is less than approximately 1.50 wt %. For example, the oxygen content may be approximately 1.40 wt %, 1.25 wt %, 0.50 wt %, 0.25 wt %, or 0.10 wt % or less. In one embodiment, the sulfur content is less than 100 ppmw. For example, the sulfur content may be approximately 75 ppmw, 50 ppmw, 25 ppmw, 10 ppmw, 5 ppmw, 1 ppmw or less. Accordingly, the biodiesel obtained from the distillate product 86 is considered an ultra-low sulfur diesel (ULSD), which generally has less than 10 ppmw sulfur. Regarding the nitrogen content, in certain embodiments, the nitrogen content of the substantially fully deoxygenated $C_{4+}$ hydrocarbon liquid is less than 1000 ppmw. For example, the nitrogen content may be approximately 750 ppmw, 500 ppmw, 250 ppmw, 100 ppmw, 75 ppmw, 50 ppmw, 25 ppmw, 10 ppmw, or 1 ppmw or less.

As discussed above, hydrocarbon liquid products such as the distillate product 86 generated from hydroprocessing of solid biomass feedstock (e.g., the solid feedstock 24) generally requires additional processing to upgrade and improve product properties such as cetane number, reduced density, reduced sulfur and/or nitrogen content, reduced benzene content (e.g., as a result of selective saturation), among others, and facilitate tailoring the overall hydrocarbon product to certain location and market specifications, among other benefits. However, the additional processing to upgrade the distillate product 86 introduces complexity to the process, while also increasing the overall cost of producing commercially viable biodiesel fuels having the desired specifications set forth by various fuel regulations. However, it has been recognized that by blending the distillate product 86 with a hydrotreated ester and/or fatty acid (HEFA), the product properties (e.g., cetane number, density) are improved without requiring additional processing to upgrade the distillate product 86. Therefore, in accordance with an embodiment of the present disclosure, the distillate product 86 is mixed with HEFA-derived biodiesel 90 to yield a commercially viable biodiesel blend 92 that does not require upgrading via complex and costly processing. As discussed in further detail below, the HEFA-derived biodiesel 90 may be generated from hydroprocessing renewable fats and oils. The HEFA-derived biodiesel 90 may be non-isomerized HEFA (e.g., HEFA 128), isomerized HEFA (e.g., isomerized HEFA 134) or a combination of non-isomerized and isomerized HEFA.

As discussed above, blending the distillate product 86 with the HEFA-derived biodiesel 90 may provide biodiesel formulations having improved cetane number, density and cold flow properties compared to biodiesel fuel formulations made up of the distillate product 86 and the HEFA-derived biodiesel 90 alone. For example, by blending the distillate product 86 with the HEFA-derived biodiesel 90, the aromaticity of the distillate product 86 may be decreased, thereby increasing the cetane number of the biodiesel blend 92 compared to the distillate product 86. Moreover, the density of the biodiesel blend 92 may have a lower density compared to the density of the distillate product 86. Therefore, by blending the distillate product 86 with the HEFA-derived biodiesel 90, the resultant biodiesel blend 92 may have the desired cetane number and density to meet regulatory specifications without having to subject the distillate product 86 to additional processing used to upgrade the distillate product 86.

In certain embodiments, the HEFA-derived biodiesel 90 may be highly n-paraffinic (e.g., having linear long chain hydrocarbon having 15 carbon atoms or more). As discussed above, the cloud point (CP) and cold flow pour point (CFPP) of certain n-paraffinic HEFA compositions, are undesirable due to the n-paraffinic content. Therefore, these n-paraffinic HEFA compositions generally undergo hydroisomerization to isomerize n-paraffins, thereby generating short chain hydrocarbons (e.g., iso-paraffins) and decreasing the CP and CFPP temperatures. However, surprisingly, it has been found that by blending the n-paraffinic HEFA compositions with the distillate product 86, the CP and CFPP of the n-paraffinic HEFA compositions may be improved without having to subject the n-paraffinic HEFA compositions to costly hydroisomerization processes. However, in certain embodiments, at least a portion of the n-paraffinic HEFA composition is subjected to hydroisomerization. For example, the n-paraffinic HEFA composition may be hydroisomerized such that the amount of iso-paraffinic compounds in the HEFA composition results in a cloud point below approximately 0° C.

Figure 2:
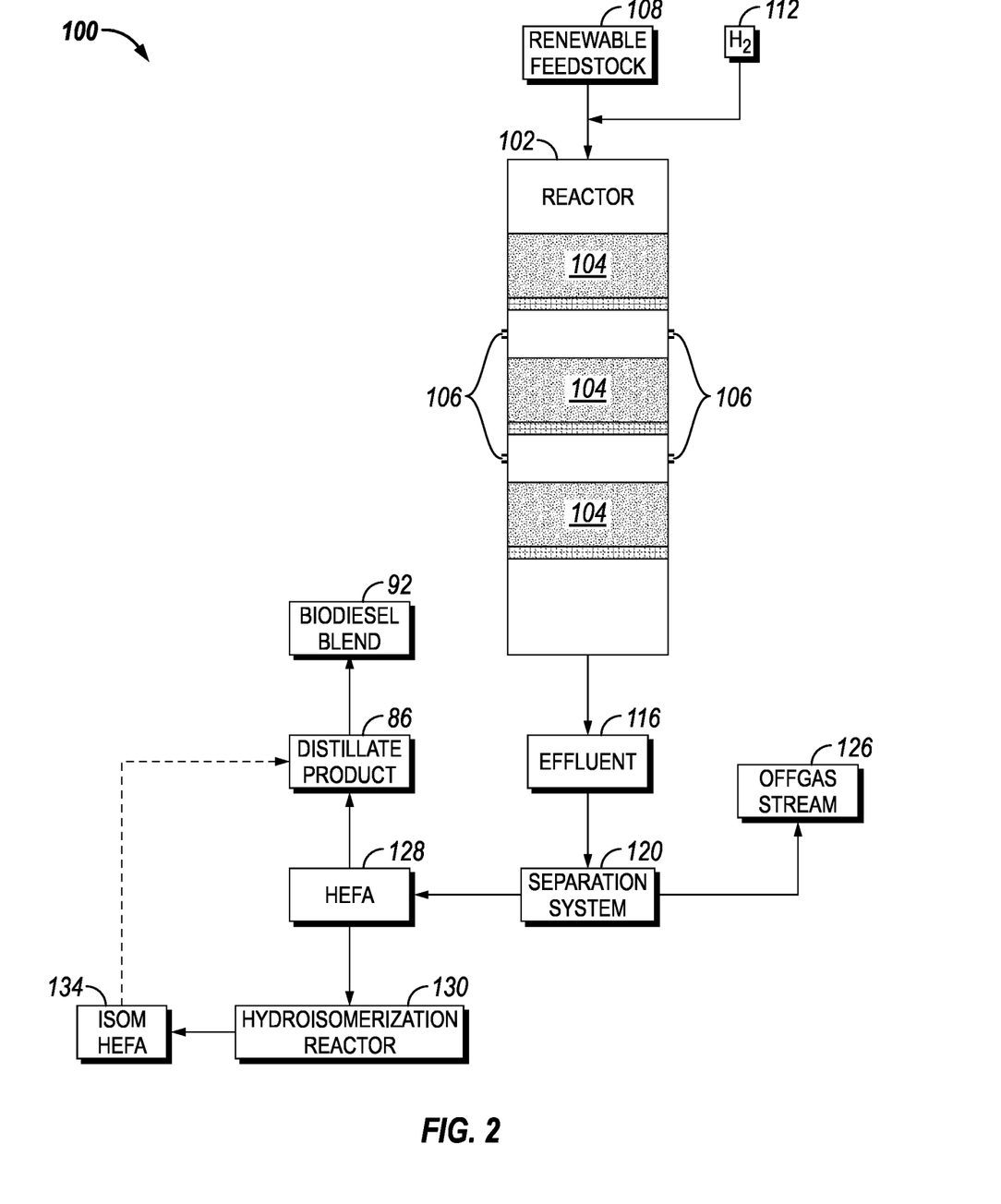
FIG. 2 is a hydroconversion system having a hydroconversion reactor used to produce a hydrotreated ester fatty acid (HEFA) used in combination with the GO of FIG. 1 to generate the biofuel blend, in accordance with an embodiment of the present disclosure.

The HEFA-derived biodiesel 90 may be generated by any suitable hydroprocessing technique such as those disclosed in U.S. Pat. No. 8,912,374, which is hereby incorporated by reference in its entirety. By way of non-limiting example, FIG. 2 is a block diagram of a system 100 that may be used for hydroprocessing renewable fats and oil to generate the HEFA-derived biodiesel 90. The system 100 includes a hydrotreating reactor 102 having one or more catalyst beds 104. Each catalyst bed 104 may be on a catalyst support grid with a distribution/redistribution tray placed above each catalyst bed 104. The hydrotreating reactor 102 may also include quench mixing devices having quench fluid inlets 106 on an outer wall of the hydrotreating reactor 102.

In the illustrated embodiment, a renewable feedstock 108 having a renewable fat or oil (e.g., vegetable oil) is introduced into the hydrotreating reactor 102 along with hydrogen ($H_2$) gas 112. The $H_2$ gas 112 may be from any suitable source. In certain embodiments, the $H_2$ gas 112 may be a "green hydrogen," which may be generated by electrolysis of water powered from wind and/or photovoltaic energy. While in in the hydrotreating reactor 102, the renewable feedstock flows through and contacts the hydrotreating catalyst in the one or more catalyst beds 104. The hydrotreating catalyst facilitates hydrogenation, hydrodeoxygenation, hydrodenitrogenation, and hydrodesulfurization reactions in the hydrotreating reactor 102. The hydrotreating reactor 102 may be a fluidized bed reactor, fixed-bed reactor or any other suitable reactor.

The renewable feedstock 108 used in the hydrotreating reactor 102 may include vegetable oils, oils obtained from algae and animal fats having triglycerides, diglycerides, monoglycerides and free fatty acids or fatty acid esters. In certain embodiments, the renewable feedstock 108 may include deconstructed materials such as pyrolyzed recyclable materials or wood. By way of non-limiting example, the renewable feedstock 108 may include fatty acid methyl esters, fatty acid ethyl esters, algal oil, brown grease, canola oil, *carinata* oil, castor oil, coconut oil, colza oil, corn oil, cottonseed oil, fish oil, hempseed oil, jatropha oil, lard, linseed oil, milk fats, mustard oil, olive oil, palm oil, peanut oil, rapeseed oil, sewage sludge, soy oils, soybean oil, sunflower oil, tall oil, tallow, train oil, used cooking oil, yellow grease, the like and combinations thereof. In certain embodiments, the renewable feedstock 108 may be pretreated prior to feeding to the hydrotreating reactor 102 to remove impurities and other undesirable components. The renewable feedstock 108 is provided to the hydrotreating reactor 102 via any suitable means such as via a pump.

Hydroprocessing the renewable feedstock 108 is carried out in the hydroprocessing reactor 102 in the presence of hydrogen (e.g., the hydrogen gas 112) at a pressure in a range of between approximately 1.0 MPa to approximately 20 MPa and at a temperature in a range of from approximately 200° C. to 410° C. Preferably, the pressure is selected from 2.0 MPa to 15 MPa, and the temperature is in the range of from 200 to 400° C., more preferably from 240 to 390° C., most preferably from 260 to 385° C. The liquid hourly space velocity is in a range of from approximately 0.3 $m^3/m^3 \cdot h$ to 5 $m^3/m^3 \cdot h$ based on fresh feed. In certain embodiments, the total feed entering the hydrotreating reactor 102 may have approximately 50-20000 ppmw, preferably 1000-8000 ppmw, most preferably 2000-5000 ppmw of sulfur, calculated as elemental sulfur. The term "total feed" is intended to denote the total of fresh feed and any optional diluting agent(s). The ratio of the hydrogen gas 112 to the renewable feedstock 108 (excluding diluent) supplied to the hydrotreating reactor 102 is in a range of from approximately 200 to 10,000 normal L (at standard conditions of 0° C. and 1 atm (0.101 MPa)) per kg of the renewable feedstock 108, preferably from approximately 500 to 8,000 NL/kg, more preferably from approximately 800 to 3,000 NL/kg.

Hydrotreating of the renewable feedstock 108 in the hydroprocessing reactor 102 is an exothermic process. Therefore, to control any temperature increase in the catalyst bed 104, a staged supply of the renewable feedstock 108 and/or the hydrogen 112 may be applied. In certain embodiments, the renewable feedstock 108 may be diluted, preferably by recycling a portion of a hydrotreated liquid stream. Alternatively, a quench fluid (e.g., a hydrotreated liquid stream and/or recycle gas) may be fed to the hydroprocessing reactor 102 between each catalyst bed 104 via the quench fluid inlets 106.

Each catalyst bed 104 includes a catalyst suitable for hydrotreating. The hydrotreating catalyst includes metals of Group VIII and/or Group VIB. In certain embodiments, the metals are in sulfided form rather than in the oxide form. By way of non-limiting example, the hydrotreating catalyst active metal includes sulfided nickel, sulfided cobalt, sulfided molybdenum, sulfided tungsten, sulfided CoMo, sulfided NiMo, sulfided MoW, sulfided NiW, and combinations thereof. In certain embodiments, the catalyst may have a mixture of two types of catalysts. In other embodiments, successive catalyst beds 104, including stacked beds, may have the same or different catalysts and/or catalyst blends. When using a sulfided hydrotreating catalyst, a sulfur source will typically be supplied to the hydrotreating catalyst in order to keep the catalyst in sulfided form during the hydrotreating step. The hydrotreating catalyst may be sulfided in-situ or ex-situ. In-situ sulfiding may be achieved by supplying a sulfur source, usually $H_2S$ or an $H_2S$ precursor (i.e. a compound that easily decomposes into $H_2S$ such as, for example, dimethyl disulfide, di-tert-nonyl polysulfide or di-tert-butyl polysulfide) to the hydrotreating catalyst during operation of the process. The sulfur source may be supplied with the feed, the hydrogen stream, or separately. An alternative suitable sulfur source is a sulfur-containing hydrocarbon stream boiling in the diesel or kerosene boiling range that is co-fed with the feedstock. In addition, added sulfur compounds in hydrotreating feed facilitate the control of catalyst stability and reduce hydrogen consumption.

The hydrogenation catalyst may be used in bulk metal form or the metals may be supported on a carrier. Suitable carriers include refractory oxides, molecular sieves and combinations thereof. Examples of suitable refractory oxides include, but are not limited to, alumina, amorphous silica-alumina, titania, silica, and combinations thereof.

Hydrotreating the renewable feedstock 108 in the hydrotreating reactor 102 produces an effluent 116 having a hydrotreated liquid and a vapor phase having hydrogen, $H_2S$, $CO_2$, carbon monoxide and light hydrocarbons. The effluent 116 is separated into one or more liquid streams and one or more offgas streams. For example, in the illustrated embodiment, the effluent 116 is fed to a separation system 120 that separates the effluent 116 into one or more liquid streams and one or more offgas streams 126. The offgas stream 126 may be fed to one or more treatment systems for desulfurization. The hydrotreating process may also generate additional streams such as, but not limited to, a hydrogen-enriched stream, a CO-enriched stream and a HEFA 128.

The separation system 120 may include, for example, gas/liquid separators, including hot high- and low-pressure separators, intermediate high- and low-pressure separators, cold high- and low-pressure separators, strippers, integrated strippers and combinations thereof. Integrated strippers include strippers that are integrated with hot high- and low-pressure separators, intermediate high- and low-pressure separators, cold high- and low-pressure separators. It will be understood by those skilled in the art that high-pressure separators operate at a pressure that is close to the pressure of the hydrotreating reactor 102, suitably between approximately 0 and 1 MPa below the reactor outlet pressure, while a low-pressure separator is operated at a pressure that is lower than the pressure of the hydrotreating reactor 102 or high-pressure separator, between approximately 0 and 1.5 MPa. Similarly, the hot-separator is operated at a temperature that is close to the temperature of the hydrotreating reactor 102, which is, for example, ≥20° C., preferably ≥10° C. above the water dew point and greater than salt deposition temperatures (e.g., ≥20° C., preferably ≥10° C., above the salt deposition temperature), while intermediate- and cold-separators are at a reduced temperature relative to the temperature of the hydrotreating reactor 102. For example, a cold-separator is generally at a temperature that can be achieved via an air cooler. An intermediate temperature will be understood to mean any temperature between the temperature of a hot- or cold-separator.

As discussed above, the separation system 120 separates the vapor phase from the hydrotreated liquid to generate the HEFA 128 and the offgas stream 126. The HEFA 128 is made up of mostly linear paraffinic compounds (n-paraffins) and has a low amount of aromatic compounds if any. Therefore, the cetane number of the HEFA 128 is greater than 50, which is desirable for commercially viable diesel fuels. However, due to the large content of n-paraffins in the HEFA 128, the cold flow properties, such as cloud point (CP) and cold flow pour point (CFPP), are undesirable. As such, biodiesel derived from the HEFA 128 is unsuitable for use in cold climates (e.g., at temperatures at or below the freezing temperature of water, 0° C.). Therefore, existing techniques subject the HEFA 128 to a hydroisomerization process to decrease the n-paraffinic content of the HEFA 128 and generate short chain isomers (iso-paraffins) of the n-paraffins. In this way, the cold flow properties of the HEFA 128 may be improved. Hydroisomerization of the HEFA 128 increases the overall cost of HEFA-derived biodiesel and introduces complexity to the hydrotreating process. However, it has been recognized that by combining the HEFA 128 with the distillate product 86, the cold flow properties of the HEFA 128 may be improved without the need to hydroisomerize the n-paraffins. For example, by mixing between approximately 20 volume (vol) % to 40 vol % of the distillate product 86 with the HEFA 128, the CP of the HEFA 128 may be decreased by between approximately 20% to approximately 50%. Therefore, by blending two different biodiesel composition that individually are not suitable for commercial use, properties such as cetane number, density, cloud point and cold flow pour point may be improved such that this biodiesel blend is suitable for commercial use without additional processing (e.g., upgrading). As should be recognized, blending the HEFA 128 with 50 vol % or more of the gasoil (e.g., the distillate product 86) may result in biodiesel blends that do not have the desired density. Therefore, a ratio of the HEFA to GO in the biodiesel blends disclosed herein are less than 1:1. That is, the minor component in the biodiesel blends of the present disclosure is the GO (e.g., the distillate product 86).

In certain embodiments, a portion of the HEFA 128 may be fed to a hydroisomerization reactor 130 to reduce the content of n-paraffins and generate an isomerized HEFA 134 having a greater amount of iso-paraffins than n-paraffins. For example, the hydroisomerization reactor 130 may have one or more hydroisomerization catalysts that facilitate isomerization of the n-paraffins in the HEFA 128 to iso-paraffins. The hydroisomerization catalyst may be any suitable catalyst including, but not limited to, Group VIII metals. In particular, the hydroisomerization catalyst may be platinum (Pt) and/or palladium (Pd) metal supported on a refractory oxide and/or molecular sieve. The resultant isomerized effluent may be fed to other processing systems (e.g., separators, strippers, distillation units, etc.) that separate the isomerized HEFA 134 from gases and other reaction byproducts generated during the hydroisomerization process. In this particular embodiment, the HEFA 128 within the hydroisomerization reactor 130 undergoes a reduced hydroisomerization to lower the cloud point from between approximately 15° C. and approximately 30° C. to between approximately −30° C. and 0° C. The degree of hydroisomerization of the HEFA 128 may be less than between approximately 10% and approximately 40%, such that a volume ratio of iso-paraffins to n-paraffins in the hydroisomerized HEFA 128 is between approximately 1:9 and 4:6, respectively.

Similar to the HEFA 128, in one embodiment of the present disclosure, the isomerized HEFA 134 may be combined with the distillate product 86 to generate the biodiesel blend 92. In other embodiments, the isomerized HEFA 134 is combined with the HEFA 128 and the distillate product 86. As discussed in further detail below, biodiesel blends having the isomerized HEFA (e.g., the isomerized HEFA 134) surprisingly had CP temperatures that were better than the predicted CP temperatures for blended fluids, indicating that partially isomerized HEFA, such as the isomerized HEFA 134, and biodiesel derived from solid feedstock, such as the distillate product 86, may be used to improve the cold flow properties of n-paraffinic HEFA (e.g., the HEFA 128) and the distillate product 86 without requiring extensive hydroisomerization and/or hydropolishing, respectively, of the biodiesels derived from renewable resources.

EXAMPLES

As discussed above, combining biodiesel products derived from different renewable resources (e.g., solid biomass and renewable fats and oils) improves the cold flow properties of HEFA-derived biodiesel, which may have an n-paraffinic content of greater than 90 wt %. The cloud point of the biofuel blend (e.g., the biofuel blend 92) may be predicted from the cloud points of the individual components (e.g., the distillate product 86 and the HEFA-derived biodiesel 90) and their respective volume ratios in the blend in two ways. One approach is the linear technique. The linear technique predicts the cloud point (CP) and/or cold flow pour point (CFPP) by taking the average of the sum of the individual components.

The other approach is based on a theoretical prediction using the Pauillac rule, which provides that the cloud point index ($CPI_n$) for each component in a biofuel blend is given by the following equation:

$$CPI_n = ((1.8(CP_n + 491.7)/600)^{(1/0.045)} * 10^4 \qquad (EQ.\ 1)$$

where $CP_n$ is the measured cloud point of the individual component in the biofuel blend. Having determined the $CPI_n$ for each component n in the biofuel blend, the $CPI_n$ of each respective component is used to calculate the cloud point index ($CPI_{blend}$) for the biofuel blend, on the basis that the cloud point indices blend linearly in volume. Therefore, for a biofuel blend of two components A and B, the $CPI_{blend}$ is determined according to the following equation:

$$CPI_{blend} = (\text{volume fraction}_A * CPI_A) + (\text{volume fraction}_B * CPI_B) \qquad (EQ.\ 2).$$

The $CPI_{blend}$ value may be used in EQ. 1 to predict the cloud point value for the biofuel blend ($CP_{blend}$). However, as shown in further detail below, it has been surprisingly found that the measured cloud point (CP) for the biofuel blend is lower than the CP predicted using EQ. 1 and EQ. 2. Surprisingly, it has been recognized that the biodiesel blends disclosed herein have better CP and CFPP than the predicted values based on the linear approach, the Pauillac rule, and in certain instances, both.

Set forth below are experiments illustrating the enhanced cold flow properties of the biodiesel blends disclosed herein. The blends used in the experiments below were each prepared by adding each blend component in order of decreasing density. For example, the HEFA-GO blends were prepared by adding the GO component (e.g., the distillate product 86) to a container first, followed by the HEFA component. The HEFA component in each blend was prepared from the biodiesel fraction resulting from the hydrotreatment of tallow oil according to a process similar to the process discussed above with reference to FIG. 2. In embodiments in which the biodiesel blend includes an isomerized HEFA component, the isomerized HEFA component was prepared by hydroisomerization of a portion of the HEFA component. The GO (gasoil) component in each blend was prepared from the biodiesel fraction resulting from hydropyrolysis and hydroconversion of pinewood chips according to a process similar to the process discussed above with reference to FIG. 1. Each hydrocarbon blend was tested according to ASTM-D2500 standard for measuring the cloud point (CP) and IP-309 standard for measuring the cold filter plugging point (CFPP). In method ASTM D2500 the sample is cooled down at a specific rate and examined periodically. The temperature at which a cloud is first observed at the bottom of the test jar is recorded as the cloud point.

The effects of the amount of HEFA and GO in the hydrocarbon blends on the CP and CFPP were investigated. The results for binary HEFA/GO hydrocarbon blends are provided in Tables 1 and 2, and FIGS. 3-6, which are combined plots of the cloud point (CP) as a function of the amount of HEFA in the hydrocarbon blend. The cetane index calculations used to determine the cetane index listed in Tables 1 and 2 were done according to ASTM D4737, which has been developed for standard gasoil composition; the cloud point (CP) of non-isomerized and isomerized HEFA in the tested blends are 22° C. and −28° C., respectively; and the boiling point range of the GO in the blends is either at or above 150° C. or at or above 180° C.

TABLE 1

HEFA & GASOIL (GO) FUEL BLEND COLD FLOW PROPERTIES

| | | EXP. 1 | EXP. 2 | EXP. 3 | EXP. 4 | EXP. 5 | EXP. 6 | EXP. 7 |
|---|---|---|---|---|---|---|---|---|
| HYDROCARBON BLEND (vol %) | HEFA non isom (CP 22) | 100 | | 78 | 68 | | 78 | 68 |
| | GO 150+ | — | 100 | 22 | 32 | | | |
| | GO 180+ | — | — | — | — | 100 | 22 | 32 |
| DENSITY (kg/m³) | | 779 | 904.5 | 808.1 | 819.7 | 922.2 | 811.7 | 824.8 |
| CETANE INDEX | | >100 | 30 | 81 | 71 | 28 | 80 | 71 |
| CLOUDPOINT (° C.) | MEASURED | 22 | −20 | 14 | 11 | −15 | 15 | 12 |
| | PAUILLAC | 22 | −20 | 19 | 17 | −15 | 19 | 17 |
| | LINEAR vol | 22 | −20 | 13 | 9 | −15 | 14 | 10 |
| COLD FILTER PLUGGING POINT (° C.) | | >10 | −23 | >10 | 9 | −19 | >10 | >10 |

TABLE 2

ISOMERIZED HEFA & GO FUEL BLEND COLD FLOW PROPERTIES

| | | EXP. 8 | EXP. 9 | EXP. 10 | EXP. 11 | EXP. 12 |
|---|---|---|---|---|---|---|
| HYDROCARBON BLEND (vol %) | HEFA isom (CP −28) | 100 | 91 | 87 | 78 | 78 |
| | GO 150+ | — | 9 | 13 | 22 | — |
| | GO 180+ | — | — | — | — | 22 |
| DENSITY (kg/m³) | | 774.1 | 785.6 | 791.4 | 803.3 | 806.9 |
| CETANE INDEX | | >100 | 89 | 84 | 75 | 75 |
| CLOUDPOINT (° C.) | MEASURED | −28 | −28 | −28 | −27 | −26 |
| | PAUILLAC | −28 | −27 | −27 | −26 | −24 |
| | LINEAR vol | −28 | −28 | −27 | −26 | −25 |
| COLD FILTER PLUGGING POINT (° C.) | | −27 | −27 | −27 | −26 | −25 |

Figure 3:
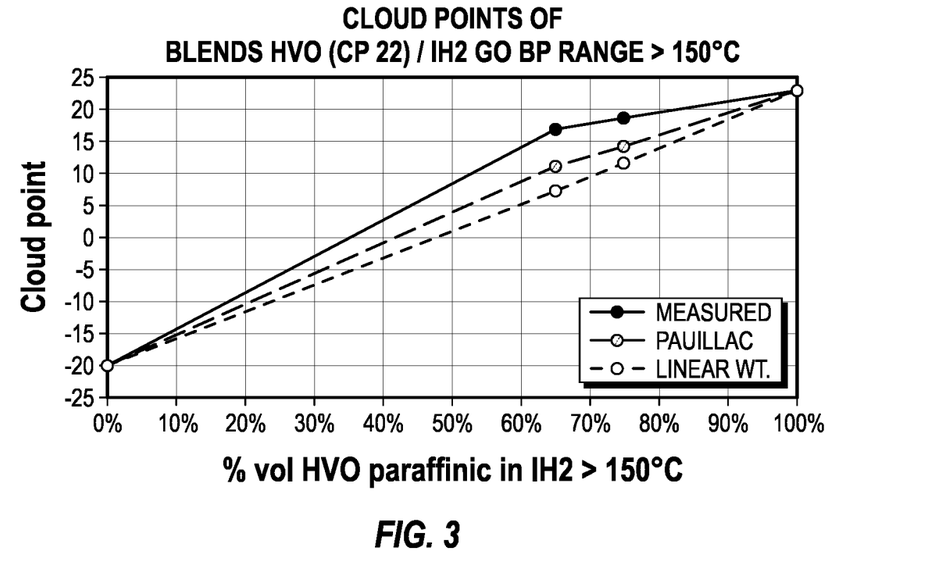
FIG. 3 is plot of cloud point in degrees Celsius (° C.) as a function of an amount of non-isomerized HEFA in volume % (vol %) in the biofuel blend in which the GO in the biofuel blend is from a distillation fraction having a boiling point>150° C.
Figure 4:
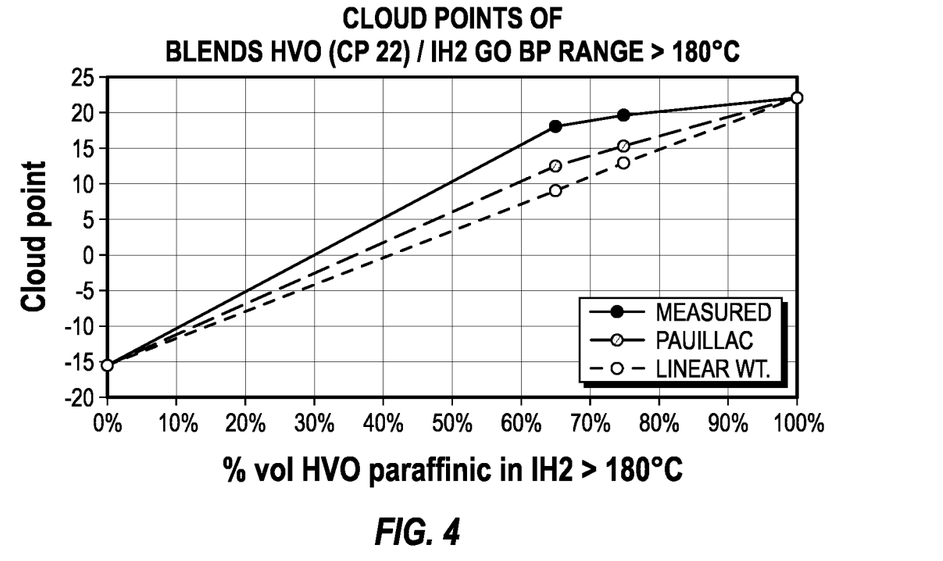
FIG. 4 is plot of cloud point in ° C. as a function of an amount of non-isomerized HEFA in vol % in the biofuel blend in which the GO in the biofuel blend is from a distillation fraction having a boiling point>180° C.

As shown by the data in Table 1 and FIGS. 3 and 4, the cloud point of non-isomerized HEFA/GO binary blends were improved by approximately 32% and approximately 50% percent compared to HEFA alone. Surprisingly, the measured cloud point was better than the Pauillac rule predicted cloud point discussed above, thereby the non-isomerized HEFA/GO binary blends have better a better CP temperature than expected. Therefore, by blending a non-upgraded gasoil product generated from hydroprocessing of solid biomass, the cloud point of HEFA that has not been hydroisomerized is improved more than expected. Without being bound by theory, the disclosed biofuel blends derived from biorenewable resources such as vegetable oil (e.g., HEFA) and solid biomass (e.g., wood), are compositionally different from fossil-derived fuels. As such, these biofuels have different properties and behave in a manner that is different from fossil fuels. However, models used to predict the behavior of biofuels are the same as those used for fossil fuels Therefore, as shown in Tables 1 and 2 and FIGS. 3 and 4, the measured cloud point of the biofuels is less (e.g., better) than the predicted cloud point using the Pauillac model. As such, based on the experimental data, it has been recognized that the Pauillac model used for fossil blends surprisingly does not apply to the biofuels disclosed herein.

Figure 5:
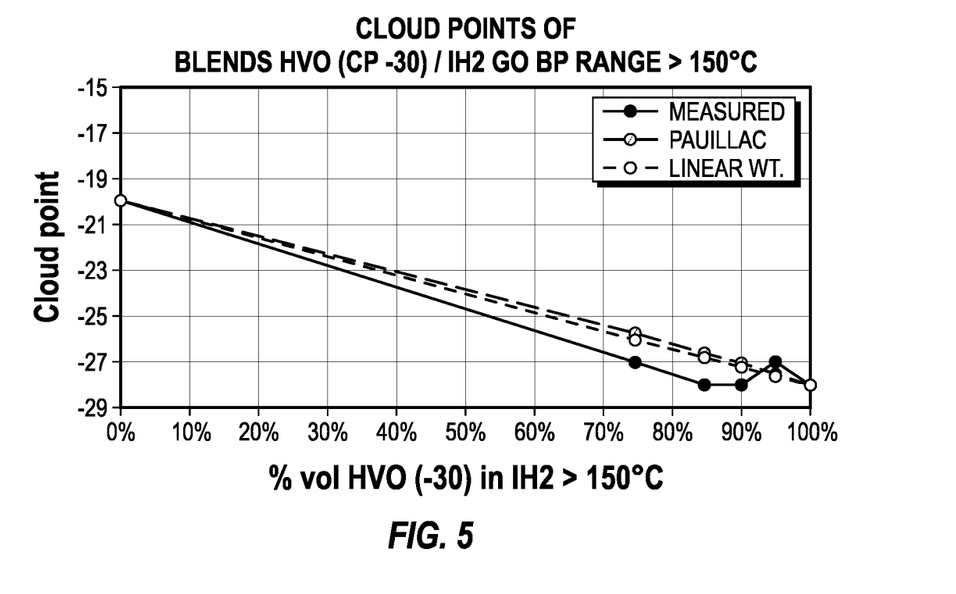
FIG. 5 is plot of cloud point in ° C. as a function of an amount of isomerized HEFA in vol % in the biofuel blend in which the GO in the biofuel blend is from a distillation fraction having a boiling point>150° C.
Figure 6:
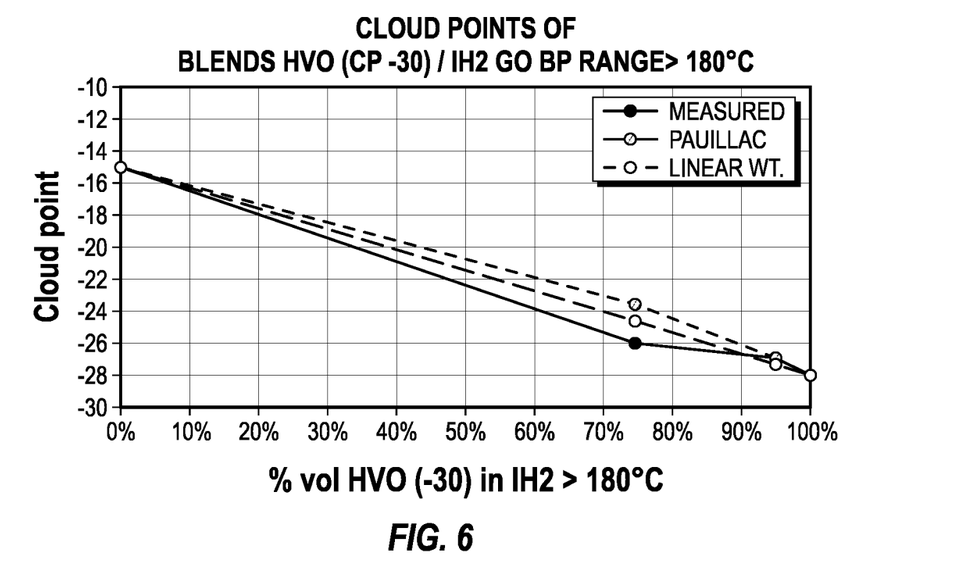
FIG. 6 is plot of cloud point in ° C. as a function of an amount of isomerized HEFA in vol % in the biofuel blend in which the GO in the biofuel blend is from a distillation fraction having a boiling point>180° C.

Additionally, as shown in Table 2 and FIGS. 5 and 6, an improvement is seen when isomerized HEFA is blended with GO. Indeed, the measured cloud point is surprising better than both the linear and Pauillac rule predicted cloud point. Accordingly, the isomerized HEFA may be blended with non-upgraded GO (e.g., gasoils that have not been subjected to hydropolishing) to improve the cloud point of GO without having to add cloud point depressants to reach cloud points suitable to the intended market. For example, in certain instances, the cloud point of the GO is not suitable for arctic climates. Accordingly, cloud point depressants may be added to the GO to decrease the cloud point to a level suitable for arctic climates. However, the use of cloud point depressants may be challenging and does not always achieve the desired cloud point. By mixing the GO with isomerized HEFA, the cloud point of the GO/HEFA blend may be tailored to the desired market.

Figure 7:
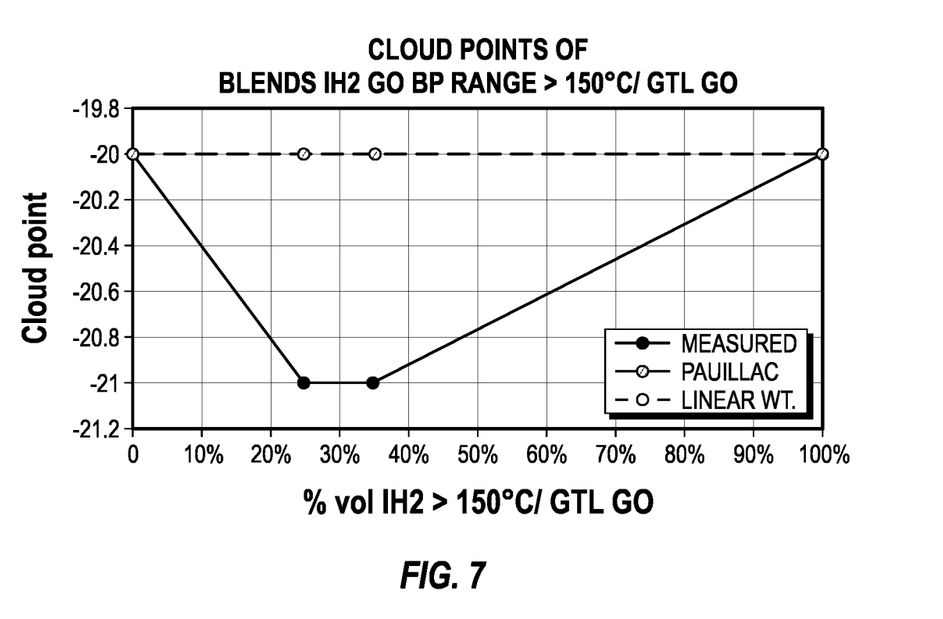
FIG. 7 is plot of cloud point in ° C. as a function of a GO in vol % in the biofuel blend in which the biofuel blend is a mixture of a GO from a distillation fraction having a boiling point>150° C. and a GO from a gas-to-liquid (GTL) process.

Table 3 illustrates the cloud point of binary blends prepared by mixing a fossil-derived gas-to liquid (GTL) derived GO and solid biomass derived GO (e.g., the distillate product 86). GO derived from fossil-derived GTL processes have a composition similar to that of the HEFA. Therefore, GTL-derived GO is generally low in aromatics resulting in cetane indices greater than 46 and has an n-paraffinic content similar to that of HEFA. As shown in Table 3 and FIG. 7, the measured cloud point of the GTL:GO biodiesel blends was surprisingly better than the cloud points predicted by the linear model and Pauillac model. Therefore, using non-upgraded GO derived from hydroprocessing of solid biomass in combination with GTL derived GO provides a biodiesel blend having cold flow properties suitable for use in cold climates. As such, an upgrading process generally required for solid biomass derived GO to provide a commercially viable biodiesel may not be necessary. These non-upgraded GO may be successfully blended with GTL and/or HEFA-derived biodiesel composition to generate a commercially viable biodiesel fuel. Therefore, the cost and complexity associated with upgrading the GO may be mitigated. In addition, it may not be necessary to blend the non-upgraded GO with fossil-derived diesel components, which increases the carbon footprint of the biodiesel fuel, to improve the properties of the non-upgraded GO and meet specifications set forth diesel fuels.

TABLE 3

GTL: GO FUEL BLEND COLD FLOW PROPERTIES

| | | EXP. 13 | EXP. 14 | EXP. 15 |
|---|---|---|---|---|
| HYDROCARBON | GO 150+ | — | 22 | 32 |
| BLEND (vol %) | GTL | 100 | 78 | 68 |
| DENSITY (kg/m$^3$) | | 778.5 | 806.6 | 818.2 |
| CETANE INDEX | | 89 | 69 | 62 |
| CLOUDPOINT (° C.) | MEASURED | −20 | −21 | −21 |
| | PAUILLAC | −20 | −20 | −20 |
| | LINEAR vol | −20 | −20 | −20 |
| COLD FILTER PLUGGING POINT (° C.) | | −20 | −22 | −22 |

The non-upgraded GO biodiesel was also used to prepare ternary blends having isomerized HEFA and fossil-derived biodiesel. The composition of the fossil-derived biodiesel is shown in Table 4. Similar to the binary blend experiments, the cloud point and cold flow pour point of the ternary blends were measured according to the respective standard (e.g., ASTM-D2500 and IP-309). As shown in Table 5, both the cloud point and the cold flow pour point of blends were surprisingly better than the model predicted values. Moreover, blends that do not include a fatty acid methanol ester (FAME), EXPs. 17, 18, and 20, had comparable or better cloud point and cold flow pour point than blends having the FAME (EXPs. 16 and 19). Therefore, the FAME may be replaced by the biodiesel components disclosed herein, thereby reducing the carbon footprint of the fossil-derived diesel, such as ultra-low sulfur diesel (ULSD).

Additionally, the amount of fossil-derived biodiesel in blends having non-upgraded GO biodiesel may also be reduced without affecting the overall properties of the diesel blend. Indeed, as shown in Table 5, ternary blends having approximately 19% fossil-derived diesel surprisingly have a better cloud point and cold flow pour point than the linear and Pauillac predicted values.

TABLE 4

FOSSIL BLEND FORMULATION

| COMPONENT | VOL % | DENSITY (kg/m$^3$) |
|---|---|---|
| Hydrocracker Unit (HCU) GO | 15.2 | 819.5 |
| Hydrodesulfurization Unit (HDSU)-1 GO | 22.8 | 835.9 |
| HDSU-2 GO | 22.8 | 842.1 |
| HDSU-6 GO | 22.8 | 846.6 |
| Hydroconversion Unit GO | 11.4 | 828.3 |
| kero (T1087) | 5.0 | 803.5 |

TABLE 5

GASOIL (GO), HEFA & FUEL BLEND AND CLOUDPOINTS

| | EXP. 16 | EXP. 17 | EXP. 18 | EXP. 19 | EXP. 20 | EXP. 21 |
|---|---|---|---|---|---|---|
| GO 180+ (vol %) | 24.9 | 15 | 20 | 20 | 25 | — |
| FAME (vol %) | 7 | — | — | 7 | — | — |
| HEFA ISOM (vol %) | 61.4 | 21.2 | 40 | 36.5 | 56.2 | — |

TABLE 5-continued

GASOIL (GO), HEFA & FUEL BLEND AND CLOUDPOINTS

|  | EXP. 16 | EXP. 17 | EXP. 18 | EXP. 19 | EXP. 20 | EXP. 21 |
| --- | --- | --- | --- | --- | --- | --- |
| FOSSIL BLEND (vol %) | 6.6 | 63.8 | 40 | 36.5 | 18.8 | 100 |
| DENSITY (kg/m$^3$) | 822.7 | 835.3 | 828.4 | 833.3 | 823 | 834.8 |
| VISCOSITY @ 40° C. | 2.7117 | 2.9018 | 2.7828 | 2.8691 | 2.6656 | 3.0727 |
| CP MEASURED | −16 | −6 | −11 | −9 | −19 | −1 |
| CP PAUILLAC | −12.7 | −5.2 | −9.2 | −6.5 | −14.4 | −1 |
| CP LINEAR vol | −19.7 | −8.6 | −14.2 | −12.5 | −19.1 | −1 |
| CFPP MEASURED | −20 | −10 | −19 | −14 | −22 | −6 |
| CFPP PAUILLAC | −15.7 | −9.9 | −13.6 | −10.5 | −18.2 | −6 |
| CFPP LINEAR vol | −21.8 | −12.6 | −17.4 | −15.7 | −21.6 | −6 |

The technical effects of combining non-upgraded (e.g., GO not subjected to hydropolishing and having a cetane index less than 46) GO with HEFA-derived biodiesel improves the cold flow properties, in particular the cloud point, cetane index, and handling of these HEFA-GO-derived biodiesel blends compared to the individual HEFA and GO components. Surprisingly, the resultant HEFA-GO-derived biodiesel blends have better cloud points than would be expected based on model-predicted cloud points associated with blends. For example, certain HEFA-derived biodiesels generally have cloud points that make it difficult to store and distribute them in cold climates. However, by combining these HEFA-derived biodiesels with non-upgraded GO derived from solid biomass, as discussed above with reference to FIG. 1, the cloud point of these HEFA-derived biodiesel fuels are improved without the need of adding cloud point depressants and/or hydroisomerizing the non-isomerized HEFA-derived biodiesel and/or upgrading and/or adding additives to improve the cetane number of the non-upgraded GO biodiesel. Additionally, when isomerized HEFA is used in combination with the non-upgraded GO, the cloud point of the GO is decreased compared to non-blended GO and is surprisingly better than both linear and Pauillac rule predicted cloud point. As such, the cloud point of the GO may be tailored to a desired cloud point based on the intended market by the addition of isomerized HEFA without the need to add cloud point depressants and upgrading the GO. Therefore, by combining non-upgraded GO biodiesel with HEFA-derived biodiesel (e.g., non-isomerized or isomerized HEFA), the non-upgraded GO and HEFA may be used without having to undergo costly and complex upgrading processes to generate a commercially viable biodiesel. Moreover, it may not be necessary to combine the non-upgraded GO with fossil-derived diesel, thereby decreasing the carbon footprint of biodiesel fuels.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A biofuel, comprising:
a mixture of a gasoil generated from hydropyrolysis and hydroconversion of a solid biomass containing lignocellulose and a hydroprocessed ester and fatty acid (HEFA) generated from hydrotreating a renewable resource comprising fats and oils, wherein the gasoil has a cetane index less than 46, and wherein a cetane index of the biofuel is greater than 46, and wherein the gasoil is present in an amount less than the HEFA.

2. The biofuel of claim 1, wherein the gasoil is present in an amount of from between approximately 1 volume % (vol %) and 40 vol %.

3. The biofuel of claim 1, wherein the HEFA comprises greater than 50% iso-paraffinic hydrocarbons.

4. The biofuel of claim 1, wherein the HEFA comprises greater than 50% of n-paraffinic hydrocarbons.

5. The biofuel of claim 1, wherein the gasoil has an initial boiling point greater than 145° C.

6. The biofuel of claim 1, wherein the gasoil is generated by a hydroprocess comprising:
hydropyrolysing the solid feedstock in the first stage hydropyrolysis reactor to generate a product stream comprising partially deoxygenated hydropyrolysis product, $H_2O$, $H_2$, $CO_2$, CO, $C_1$-$C_3$ gases, char and catalyst fines;
feeding at least a portion of the product stream to a second stage hydroconversion reactor comprising one or more hydroconversion catalysts; and
hydroconverting the partially deoxygenated hydropyrolysis product in the product stream to generate a vapor phase product comprising substantially fully deoxygenated hydrocarbon product, $H_2O$, CO, $CO_2$, and $C_1$-$C_3$ gases;
condensing the vapor phase product to generate a deoxygenated hydrocarbon liquid comprising the substantially fully deoxygenated hydrocarbon product, wherein the substantially fully deoxygenated hydrocarbon product comprises the gasoil.

* * * * *